US007674322B2

(12) United States Patent
Ishizawa et al.

(10) Patent No.: US 7,674,322 B2
(45) Date of Patent: Mar. 9, 2010

(54) GAS ABSORPTION DEVICE, METHOD OF MANUFACTURING THE SAME, AND LIQUID CONTAINER

(75) Inventors: Taku Ishizawa, Nagano-ken (JP); Hitotoshi Kimura, Nagano-ken (JP); Satoshi Shinada, Nagano-ken (JP); Michinari Tsukahara, Nagano-ken (JP); Yasunao Uehara, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 364 days.

(21) Appl. No.: 11/850,462

(22) Filed: Sep. 5, 2007

(65) Prior Publication Data

US 2007/0295206 A1 Dec. 27, 2007

Related U.S. Application Data

(63) Continuation of application No. 11/006,070, filed on Dec. 7, 2004, now Pat. No. 7,311,761.

(30) Foreign Application Priority Data

Dec. 11, 2003 (JP) ............................ 2003-413454
Dec. 11, 2003 (JP) ............................ 2003-413488

(51) Int. Cl.
*B41J 2/19* (2006.01)
*B01D 53/22* (2006.01)

(52) U.S. Cl. ............................................... 96/6; 347/92

(58) Field of Classification Search ....................... 96/6; 95/46, 47, 54; 347/85–87, 92
See application file for complete search history.

(56) References Cited

U.S. PATENT DOCUMENTS 4,489,334 A 12/1984 Owatari
5,425,803 A 6/1995 van Schravendijk et al.
6,273,942 B1 8/2001 Jersby (Continued)

FOREIGN PATENT DOCUMENTS

JP 55-177446 U 12/1980

(Continued)

OTHER PUBLICATIONS

Office Action received in Chinese patent appln. No. 200410098896.8 (Aug. 4, 2006), and English translation.

*Primary Examiner*—Frank M Lawrence
(74) *Attorney, Agent, or Firm*—Stroock & Stroock & Lavan LLP

(57) ABSTRACT

The present invention is a gas absorption device arranged in a liquid container storing a liquid fed to a liquid consumption apparatus. The device includes a decompressed container having an opening and a flexible film sealing the opening in the state that the decompressed container is internally decompressed. At least a part of a portion having an inner surface which receives the decompressed pressure in the decompressed container and an outer surface which is in contact with the liquid in the liquid container is formed by a gas permeable material through which gas dissolved in the liquid in the liquid container can permeate. According to the present invention, gas dissolved in the liquid stored in the liquid container can be absorbed using a decompressed space and the existence of a decompressed status necessary to absorb gas can be easily examined.

8 Claims, 11 Drawing Sheets

U.S. PATENT DOCUMENTS

| | | | |
|---|---|---|---|
| 6,557,990 | B2 | 5/2003 | Altendorf |
| 6,699,309 | B1 | 3/2004 | Worthington et al. |
| 2003/0116015 | A1 | 6/2003 | Sengupta et al. |
| 2006/0144225 | A1 | 7/2006 | Downie et al. |

FOREIGN PATENT DOCUMENTS

| | | | |
|---|---|---|---|
| JP | 57-207065 | A | 12/1982 |
| JP | 01-208145 | A | 8/1989 |
| JP | 05-017712 | A | 1/1993 |
| JP | 7-017050 | A | 1/1995 |
| JP | 7-025029 | A | 1/1995 |
| JP | 2668916 | B2 | 7/1997 |
| JP | 09-327930 | A | 12/1997 |
| JP | 11-123834 | A | 5/1999 |
| JP | 2003-159811 | A | 6/2003 |
| JP | 2003-165233 | A | 6/2003 |

GAS ABSORPTION DEVICE, METHOD OF MANUFACTURING THE SAME, AND LIQUID CONTAINER

CROSS-REFERENCE TO RELATED APPLICATIONS

This application is a continuation of U.S. patent application Ser. No. 11/006,070, filed on Dec. 7, 2004 now U.S. Pat. No. 7,311,761.

BACKGROUND OF THE INVENTION

1. Field of the Invention

The present invention relates to a gas absorption device arranged in a liquid container for storing a liquid to be fed to a liquid consumption apparatus, a method of manufacturing the same, and a liquid container having the built-in gas absorption device. The gas absorption device has a function for absorbing gas dissolved in a liquid in the liquid container.

2. Description of the Related Art

As a representative example of a conventional liquid consumption apparatus, there is a liquid ejecting apparatus for ejecting liquid drops from an ejecting head. As a representative example of the liquid ejecting apparatus, there is an ink jet recording apparatus having an ink jet recording head for image forming. The ink jet recording apparatus makes comparatively little noise during printing and can form small dots of high density, so that in recent years, it is used for many types of print including color print.

As a liquid feed method for a liquid consumption apparatus represented by an ink jet recording apparatus, there is a method for feeding a liquid to a liquid consumption apparatus from a liquid container storing the liquid. Furthermore, in the liquid feed method by the liquid container, to enable a user to simply exchange the liquid container at the point of time when the liquid in the liquid container is consumed, the liquid container is generally structured as a cartridge which is removably mounted on the liquid consumption apparatus.

Generally, the ink jet recording apparatus has a carriage provided with a recording head for ejecting ink drops, which moves back and forth along the recording face of a recording medium. As a method of feeding an ink from an ink cartridge to a recording head, there is a method that the ink cartridge is mounted on the carriage and ink is fed from the ink cartridge moving back and forth together with the recording head to the recording head. Further, as another method, there is a method that the ink cartridge is mounted in the case of the apparatus body and ink is fed from the ink cartridge to the recording head via an ink flow path made of a flexible tube.

Meanwhile, when the ink cartridge is filled with ink and then is left for many hours as it is, $N_2$ may be generated due to a chemical change of the dye in the ink. Further, when the barrier resistance of the ink container constituting the cartridge is low, there is a possibility that $N_2$ and/or $O_2$ may permeate from the outside through the container wall into the inside so as to be mixed in ink.

And, when printing is executed in the state that $N_2$ and/or $O_2$ is much dissolved in ink in the ink cartridge, bubbles may be produced in ink due to pressure changes during ejection of ink. When bubbles are produced in ink like this, defective ejection is caused due to sealing of the ink flow path by bubbles and there is a possibility of deterioration in the printing quality.

To solve the aforementioned problems, in Japanese Patent Laid-Open Publication 1-208145, an ink container for ink jet recording having a vacuum portion covered with a partition member which is insoluble in the ink components and permeable to gas is proposed.

Further, in Japanese Patent Laid-Open Publication 9-327930, an ink container for an ink jet recording apparatus in which by a film permeable to gas arranged in the ink container, the inside of the ink container is divided into an ink containing chamber and a negative pressure gas take-in chamber for taking gas into ink is proposed.

However, in the ink container having the vacuum portion covered with a partition member proposed in Japanese Patent Laid-Open Publication 1-208145, the examination of the decompressed status in the vacuum portion is very difficult and a problem arises that whether a predetermined decompressed status is ensured at the time of manufacture or not cannot be confirmed.

Further, also in the ink container which is internally divided into the ink containing chamber and the gas take-in chamber by the permeable film proposed by Japanese Patent Laid-Open Publication 9-327930, similarly, the examination of the decompressed status in the gas take-in chamber is very difficult and a problem arises that whether a predetermined decompressed status is ensured at the time of manufacture or not cannot be confirmed.

Further, in the ink container having the vacuum portion covered with the partition member proposed in Japanese Patent Laid-Open Publication 1-208145, the concerned vacuum portion is not fixed to the ink container, so that when the ink container is given a shock such as vibration or falling, there is a possibility that the vacuum portion covered with the partition member may collide with and damage the inner surface of the ink container. Further, if an ink pack formed by a flexible bag is used, when the vacuum portion covered with the partition member is located at the end position away from the ink feed port of the ink pack, the ink pack is hardly crushed, thus a problem arises that the residual amount of ink is increased.

Further, in the ink container which is internally divided into the ink containing chamber and the gas take-in chamber by the permeable film proposed by Japanese Patent Laid-Open Publication 9-327930, since the decompressed space is formed using the outer film forming the ink container, a problem arises that the manufacture of an ink container and the operation of filling ink are very complicated.

Further, in Japanese Patent Laid-Open Publication 9-327930, an example that the decompressed space is formed only by a film permeable to gas separately from the outer film is also described. In this example, the bag of a permeable film covered with a decompressed space forming member is arranged at a position away from the ink feed port of the ink container, so that a problem arises that the ink pack is hardly crushed and the residual amount of ink is increased.

SUMMARY OF THE INVENTION

The present invention was developed with the foregoing in view and is intended to provide a gas absorption device capable of absorbing gas dissolved in a liquid stored in a liquid container using a decompressed space and easily examining the existence of a decompressed status necessary to absorb gas, a method of manufacturing the same, and a liquid container having the built-in gas absorption device.

Further, the present invention is intended to provide a liquid container in which a gas absorption device capable of absorbing gas dissolved in a liquid stored in the liquid container using a decompressed space is installed, and the inner surface of a flexible liquid bag forming the liquid container is not damaged by the gas absorption device, and moreover the arrangement of the gas absorption device is optimized so as to prevent the flexible liquid bag forming the liquid container from becoming hard to be crushed.

To solve the aforementioned problems, the gas absorption device according to the first aspect of the present invention is a gas absorption device arranged in a liquid container for storing a liquid to be fed to a liquid consumption apparatus, including: a decompressed container having an opening; and a flexible film sealing the opening in a state that the decompressed container is internally decompressed. The gas absorption device includes a portion having an inner surface which receives a decompressed pressure in said decompressed container and an outer surface which is in contact with the liquid in the liquid container. At least a part of the portion of the gas absorption device is formed by a gas permeable material through which a gas dissolved in the liquid in the liquid container can permeate.

Preferably, at least a part of the decompressed container is formed by the gas permeable material.

Preferably, at least a part of the flexible film is formed by the gas permeable material.

Preferably, the gas permeable material includes thermoplastic resin.

Preferably, the thermoplastic resin is any of polypropylene, polyethylene, and polystyrene.

Preferably, the flexible film is adhered airtightly to a periphery of the opening of the decompressed container by thermal welding.

To solve the aforementioned problems, the liquid container according to the second aspect of the present invention is a liquid container for storing a liquid to be fed to a liquid consumption apparatus, including: a container body for internally storing the liquid; and any one of the above-mentioned gas absorption devices arranged in the container body.

Preferably, the container body is composed of a flexible film formed by a material having a smaller permeability to gas than a permeability to gas of the gas permeable material.

Preferably, the flexible film forming the container body is a single layer film or a laminated film having at least one kind of film of an aluminum laminated film, a silica deposited film, and an alumina deposited film.

Preferably, the liquid consumption apparatus is an ink jet recording apparatus, and the liquid container is an ink cartridge configured to be removably mounted on the ink jet recording apparatus.

To solve the aforementioned problems, the method of manufacturing a gas absorption device according to the third aspect of the present invention is a method of manufacturing a gas absorption device to be arranged in a liquid container for storing a liquid to be fed to a liquid consumption apparatus, includes: providing a decompressed container having an opening; and sealing the opening by a flexible film in a state that the decompressed container is internally decompressed to a pressure lower than an atmospheric pressure. The gas absorption device includes a portion having an inner surface which receives a decompressed pressure in the decompressed container and an outer surface which is in contact with the liquid in the liquid container, at least a part of the portion of the gas absorption device being formed by a gas permeable material through which a gas dissolved in the liquid in the liquid container can permeate.

Preferably, the method of manufacturing a gas absorption device further includes a step of examining an internal decompressed status of the decompressed container on the basis of a deflection of the flexible film sealing the opening under the atmospheric pressure.

Preferably, the step of examining the internal decompressed status of said decompressed container is executed using an optical sensor.

Preferably, the step of sealing the opening by the flexible film is executed in a decompressed chamber which is decompressed to a pressure lower than the atmospheric pressure.

To solve the aforementioned problems, the liquid container according to the fourth aspect of the present invention is a liquid container for storing a liquid to be fed to a liquid consumption apparatus, includes: a flexible liquid bag formed by a flexible film for internally storing the liquid; a liquid feed port member installed in the flexible liquid bag for sending the liquid from the flexible liquid bag to an outside; and a gas absorption device having a decompressed space for absorbing gas dissolved in the liquid stored in the flexible liquid bag, the gas absorption device being formed separately from the flexible liquid bag and arranged in the flexible liquid bag so as to be fixed to the liquid feed port member.

Preferably, the liquid feed port member and the gas absorption device have substantially common structures at their connection parts so as to enable the flexible liquid bag to be easily adhered to an outer surface of the gas absorption device when the liquid in the flexible liquid bag is consumed and the flexible liquid bag is crushed.

Preferably, at least a part of the outer surface of the gas absorption device is shaped roundly so as to enable the flexible liquid bag to be easily adhered to the outer surface of the gas absorption device when the liquid in the flexible liquid bag is consumed and the flexible liquid bag is crushed.

Preferably, an end of the gas absorption device on the opposite side of a part connected to the liquid feed port member is formed flat so as to enable the flexible liquid bag to be easily adhered to the outer surface of the gas absorption device when the liquid in the flexible liquid bag is consumed and the flexible liquid bag is crushed.

Preferably, the gas absorption device includes a decompressed container having an opening and a flexible film sealing the opening in a state that the decompressed container is internally decompressed. The gas absorption device includes a portion having an inner surface which receives a decompressed pressure in the decompressed container and an outer surface which is in contact with the liquid in the liquid container, at least a part of the portion of the gas absorption device being formed by a gas permeable material through which a gas dissolved in the liquid in the liquid container can permeate.

Preferably, the flexible film sealing the opening of the decompressed container is adhered to the opening formed on a part of the gas absorption device opposite to the liquid feed port member.

Preferably, the opening of the decompressed container is formed in a smaller dimension than a dimension of a part of the liquid feed port member opposite to the gas absorption device.

Preferably, the liquid container further includes fixing means for fixing the gas absorption device to the liquid feed port member.

Preferably, the fixing means has a claw-shaped projection installed on the liquid feed port member and a locking hole formed in the gas absorption device, the claw-shaped projection being inserted into the locking hole and locked therein.

Preferably, the liquid container further includes check valve means which opens only when the liquid flows in a direction flowing out from the flexible liquid bag. The check valve means has a check valve cover member which is formed separately from the liquid feed port member and is attached to the liquid feed port member and a valve body contained between the check valve cover member and the liquid feed port member, the claw-shaped projection being installed on the check valve cover member.

Preferably, the check valve cover member is formed integrally with the decompressed container of the gas absorption device and can move between a fixing position of the fixing means and an open position of the fixing means.

Preferably, at least a part of the decompressed container is formed by the gas permeable material.

Preferably, at least a part of the flexible film is formed by the gas permeable material.

Preferably, the gas permeable material includes thermoplastic resin.

Preferably, the thermoplastic resin is any of polypropylene, polyethylene, and polystyrene.

Preferably, the flexible film is adhered airtightly to a periphery of the opening of the decompressed container by thermal welding.

Preferably, the liquid consumption apparatus is an ink jet recording apparatus, and the liquid container is an ink cartridge to be removably mounted on the ink jet recording apparatus.

According to the present invention having the first, second, and third aspects mentioned above, a gas absorption device capable of absorbing gas dissolved in a liquid stored in a liquid container and easily examining the existence of a decompressed status necessary to absorb gas, a liquid container having the built-in gas absorption device, and a manufacturing method of the gas absorption device can be provided.

Further, according to the present invention having the fourth aspect mentioned above, a liquid container in which a gas absorption device capable of absorbing gas dissolved in a liquid stored in the liquid container using a decompressed space is installed, and the inner surface of a flexible liquid bag forming the liquid container is not damaged by the gas absorption device, and moreover the arrangement of the gas absorption device is optimized so as to prevent the flexible liquid bag forming the liquid container from becoming hard to be crushed can be provided.

BRIEF DESCRIPTION OF THE DRAWINGS

The aforementioned and other objects, characteristics, and advantages of the present invention will be shown by the following explanation by referring to the accompanying drawings, in which:

FIG. 6A is a plan view, FIG. 6B is a side view, FIG. 6C is a sectional view along the line B-B, FIG. 6D is a sectional view along the line A-A, FIG. 6E is a rear view, and FIG. 6F is a front view;

FIGS. 7A and 7B are perspective views respectively viewed from different angles, and FIGS. 7C and 7D are exploded perspective views respectively viewed from different angles;

FIG. 8A is a drawing showing a step of adhering a flexible film to a decompressed container, and FIG. 8B is a drawing showing a step of examining the decompressed status of the decompressed container;

FIG. 9A is a plan view, FIG. 9B is a side view, FIG. 9C is a sectional view along the line B-B, FIG. 9D is a sectional view along the line A-A, FIG. 9E is a rear view, and FIG. 9F is a front view;

FIGS. 10A and 10B are perspective views respectively viewed from different angles, and FIGS. 10C and 10D are exploded perspective views respectively viewed from different angles;

FIGS. 11B and 11D are a plan view and a perspective view showing the state that the check valve cover member is positioned at the fixing position of the fixing means.

DESCRIPTION OF THE PREFERRED EMBODIMENTS

Figure 1:
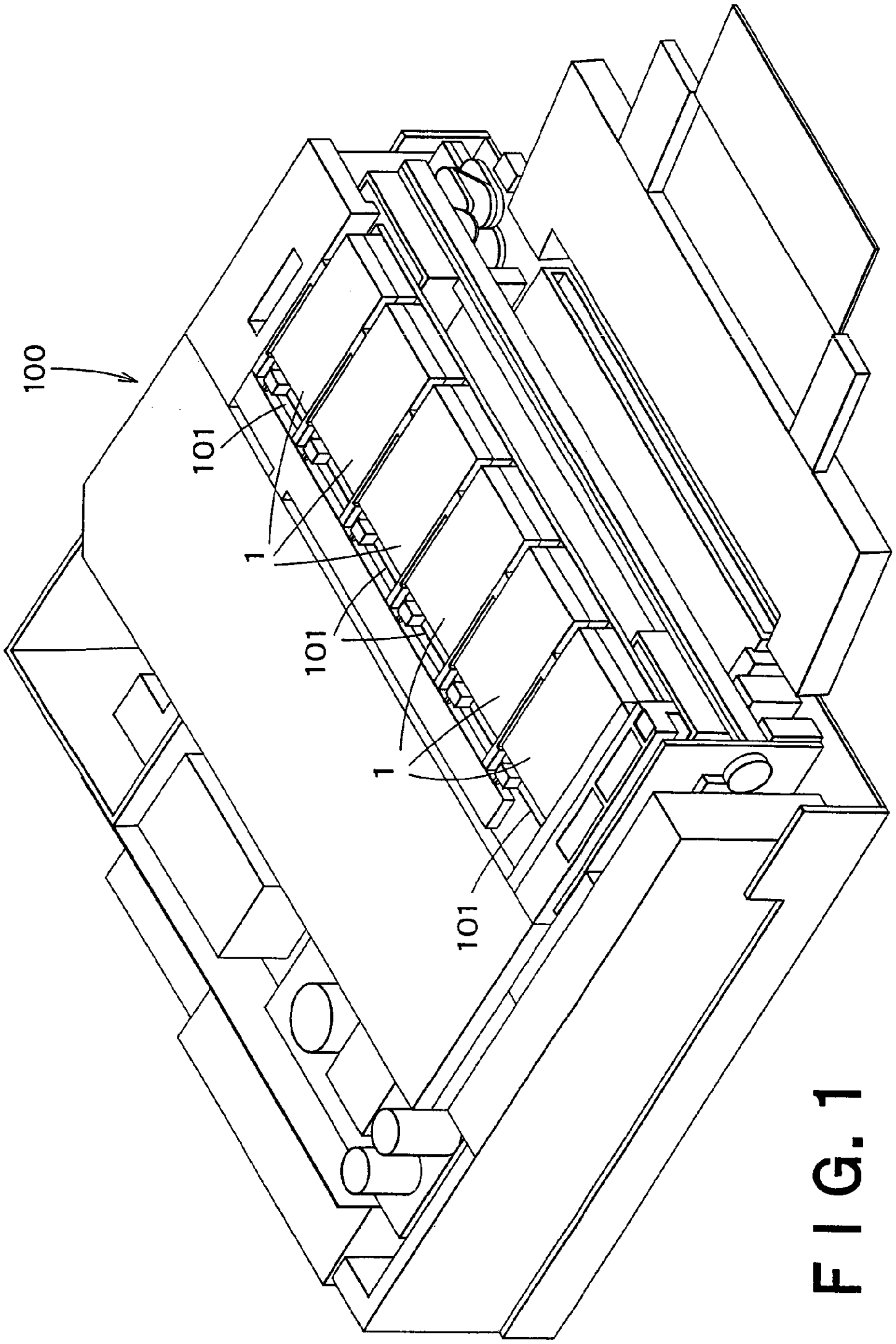
FIG. 1 is a perspective view showing an ink jet recording apparatus on which the ink cartridge of an embodiment of the present invention is mounted.

Hereinafter, as an embodiment of the liquid container having the built-in gas absorption device of the present invention, an ink cartridge of an ink jet recording apparatus will be explained by referring to the drawings.

FIG. 1 is a perspective view showing an ink jet recording apparatus 100 on which ink cartridges 1 of this embodiment are mounted in cartridge mounting units 101. In this embodiment, six cartridge mounting units 101 are installed in the ink cartridge recording apparatus 100 and each cartridge unit 101 is opened on the front of the ink jet recording apparatus 100. Further, the six cartridge mounting units 101 are placed side by side on the same horizontal plane and the six ink cartridges 1 are placed flat side by side.

Figure 2:
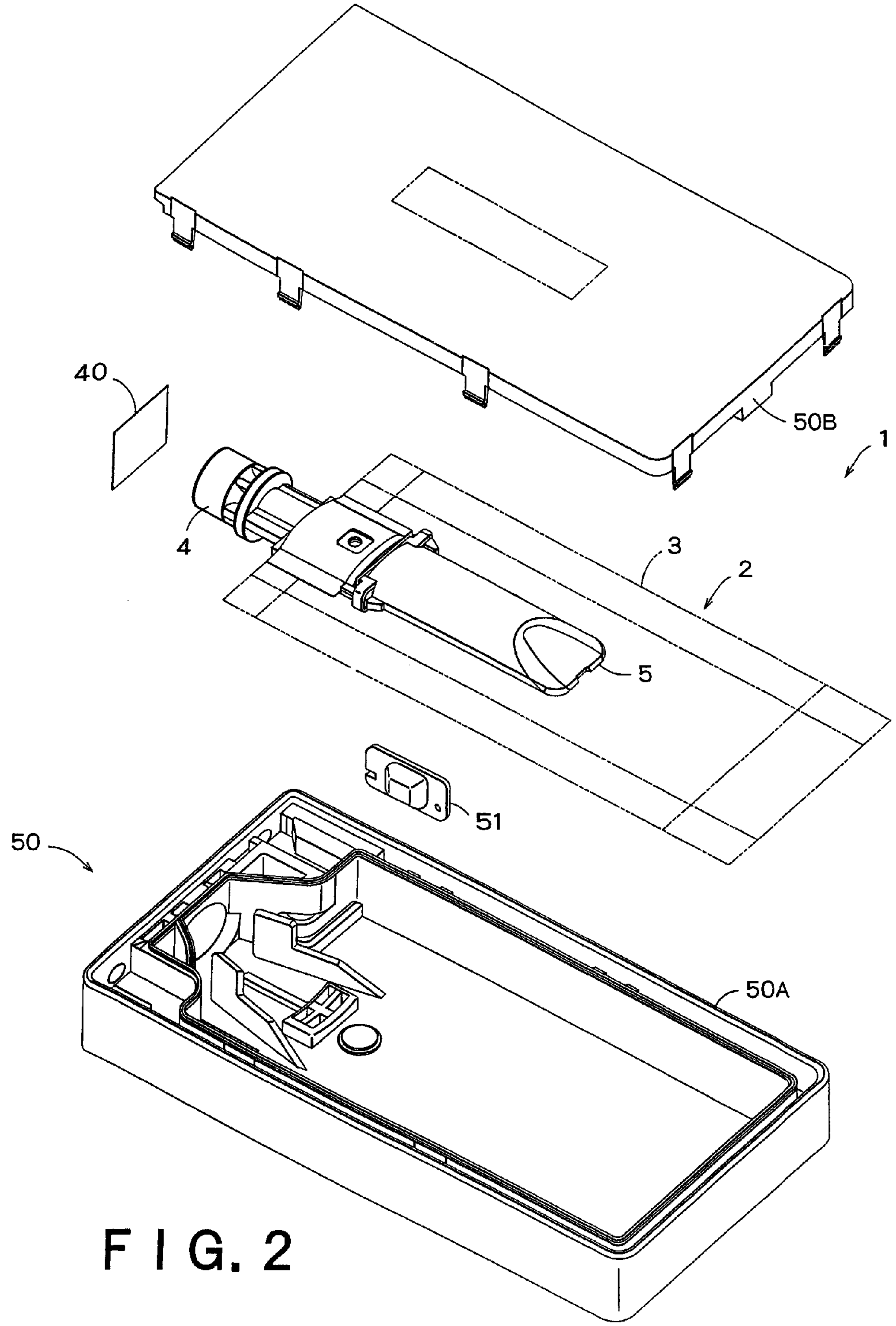
FIG. 2 is an exploded perspective view showing the ink cartridge of an embodiment of the present invention in a state that the case member of the ink cartridge is opened.

As shown in FIG. 2, each ink cartridge 1 has an ink container (liquid container) 2 and a rigid case member 50 having the built-in ink container 2. The case member 50 is composed of a case body 50A whose top is opened and a cover member 50B for sealing the top opening of the case body 50A. On the side of the case member 50, a circuit substrate 51 having a mounted IC (semiconductor storage element) for storing information such as the ink kind and residual amount is installed.

The ink container 2 has a flexible ink bag (container body) 3 formed by a flexible film for internally storing ink, an ink feed port member (liquid feed port member) 4 installed in the flexible ink bag 3 for sending ink out from the flexible ink bag 3, and a gas absorption device 5 for absorbing gases such as $N_2$ and $O_2$ dissolved in ink stored in the flexible ink bag 3. Further, the feed port of the ink feed port member 4, when it is not in use, is sealed by a feed port film 40.

Figure 3:
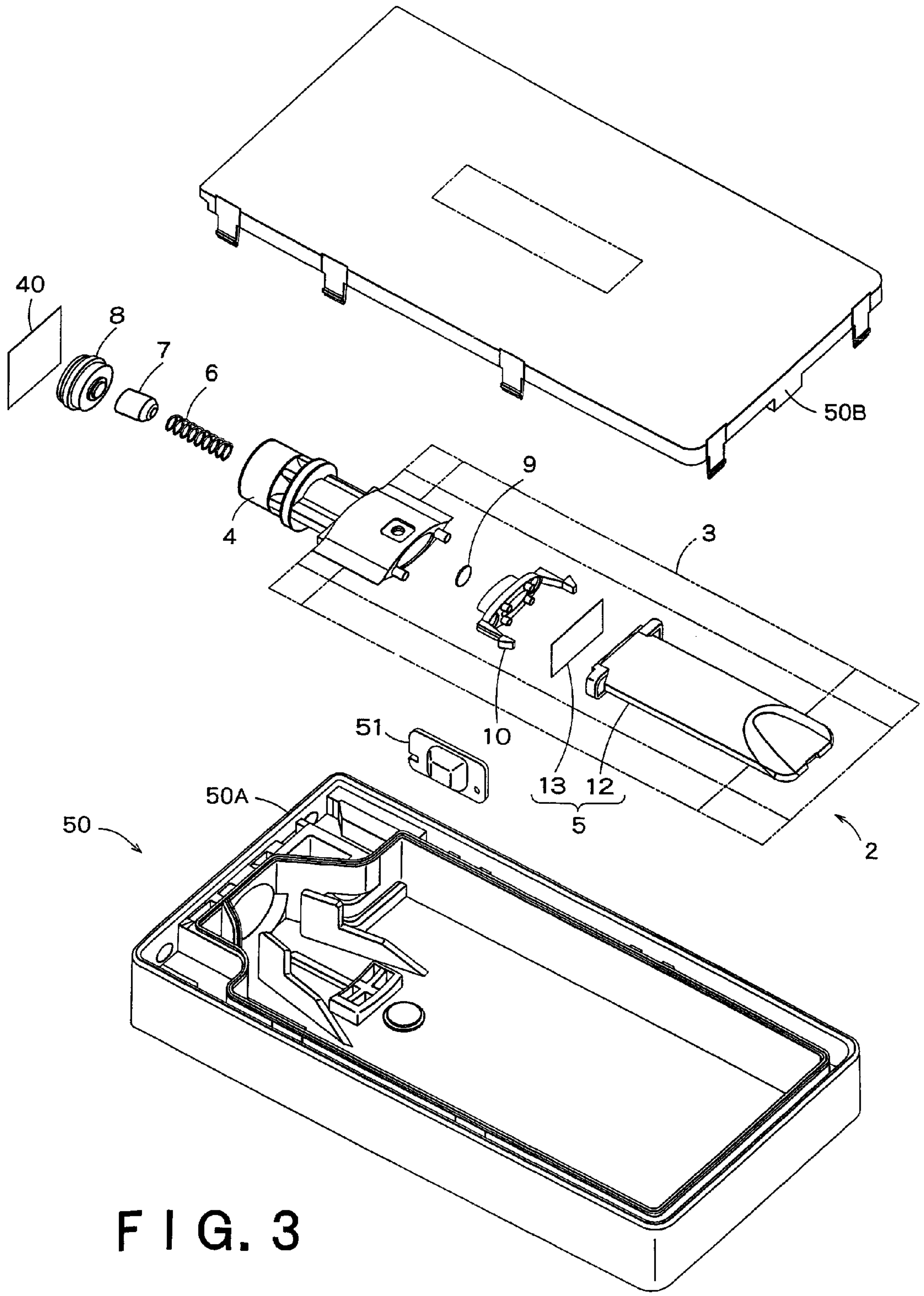
FIG. 3 is an exploded perspective view showing the ink cartridge of an embodiment of the present invention in a state that the case member of the ink cartridge is opened and the ink container 2 is decomposed.
Figure 4:
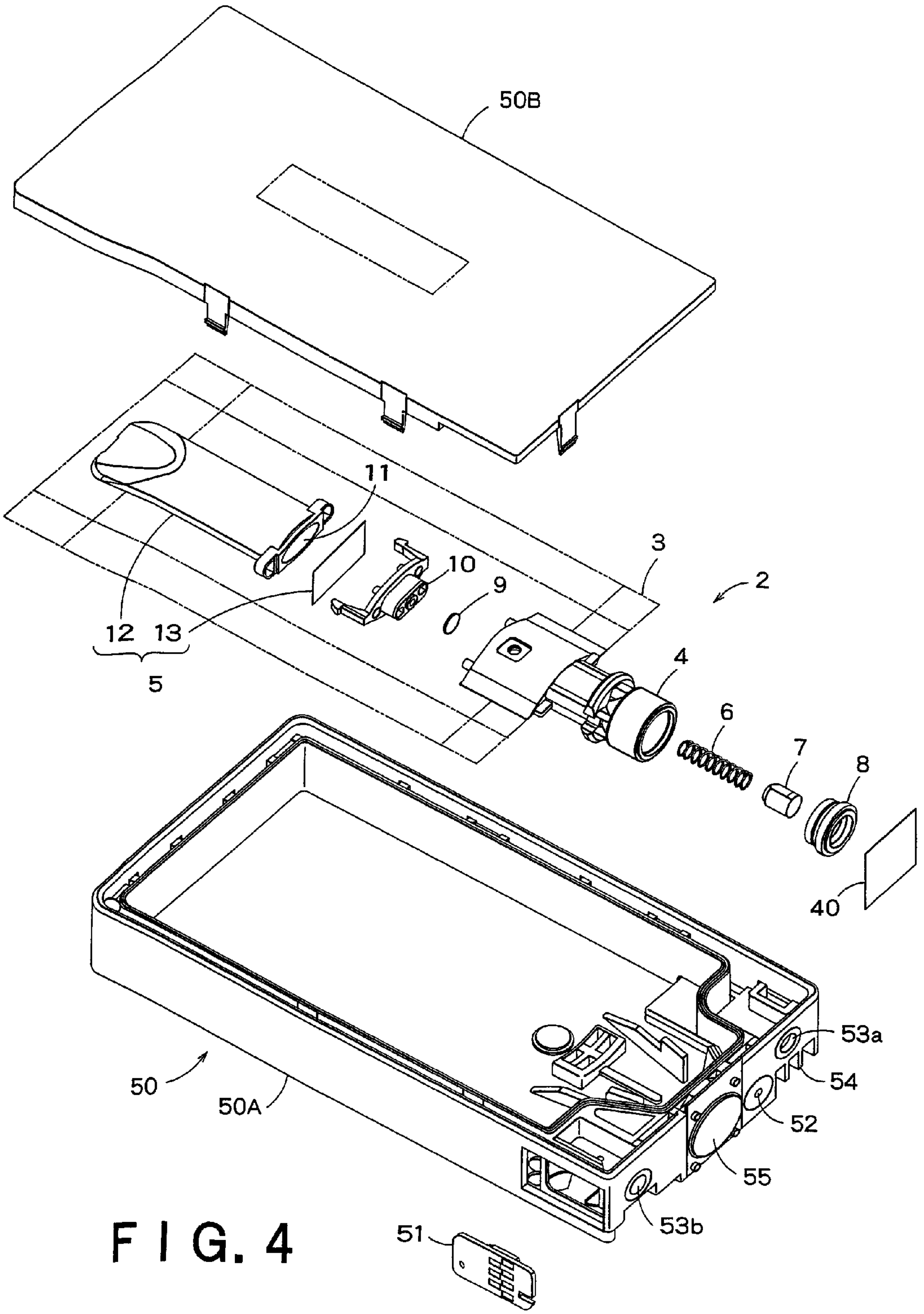
FIG. 4 is an exploded perspective view showing a state that the ink cartridge shown in FIG. 3 is viewed from a different angle.
Figure 5A:
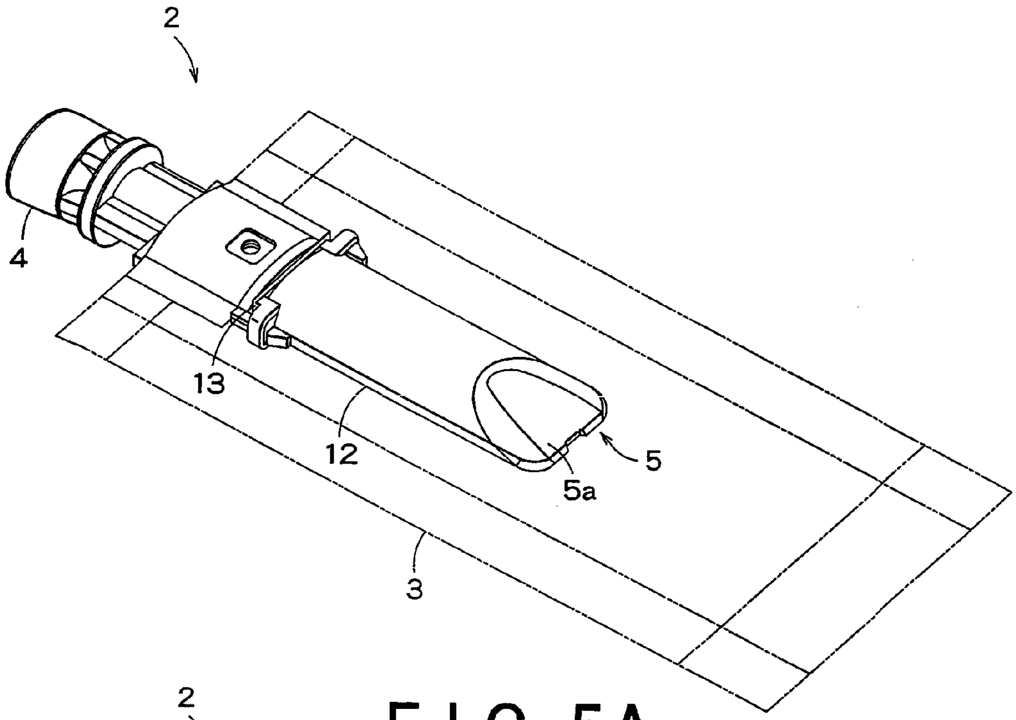
FIGS. 5A and 5B are exploded perspective views showing the ink container of the ink cartridge of an embodiment of the present invention in states that it is viewed from different angles.
Figure 5B:
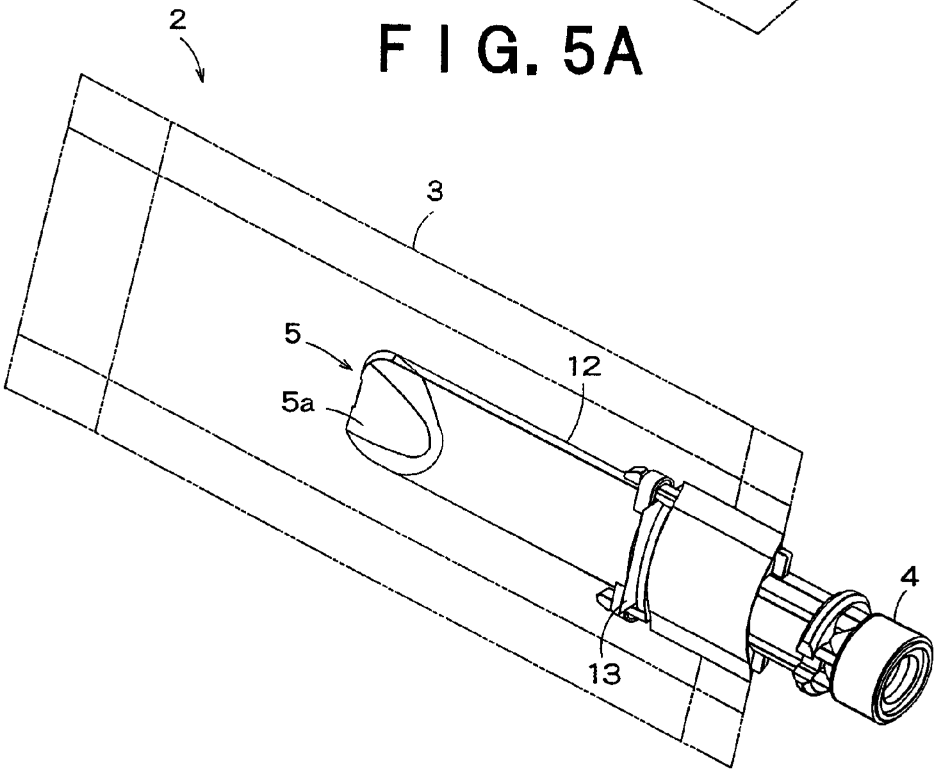
Figures 6A, 6B, 6C, 6D, 6E, 6F:
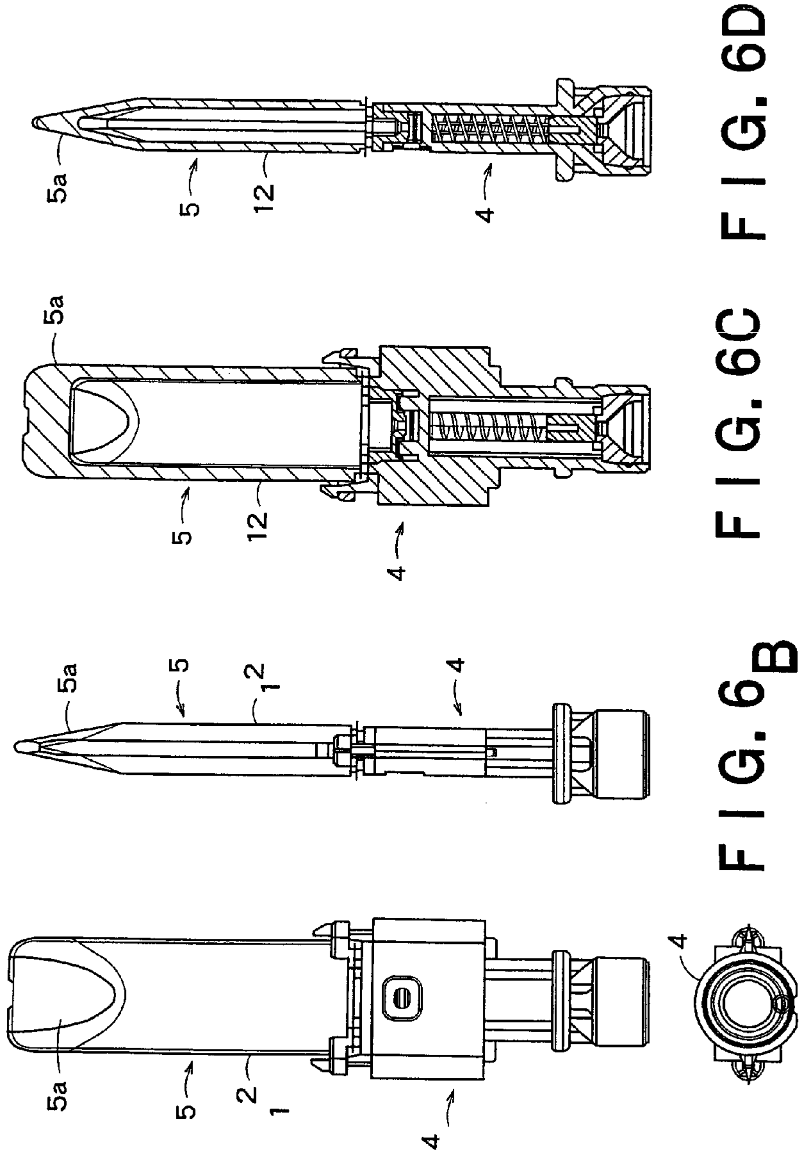
FIGS. 6A to 6F are drawings showing the ink feed port member and the gas absorption device of an embodiment of the present invention.
Figure 7A:
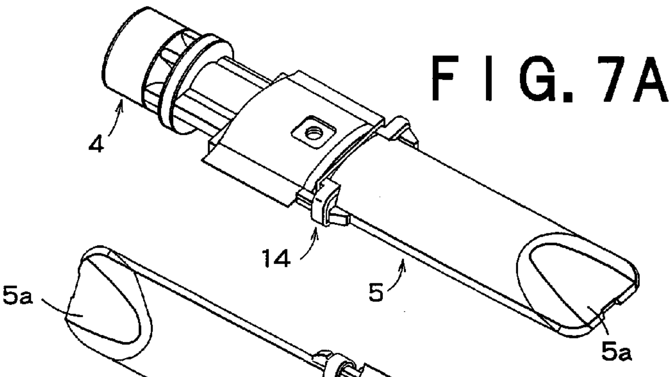
FIGS. 7A to 7D are drawings showing the ink feed port member and the gas absorption device of an embodiment of the present invention.
Figure 7B:
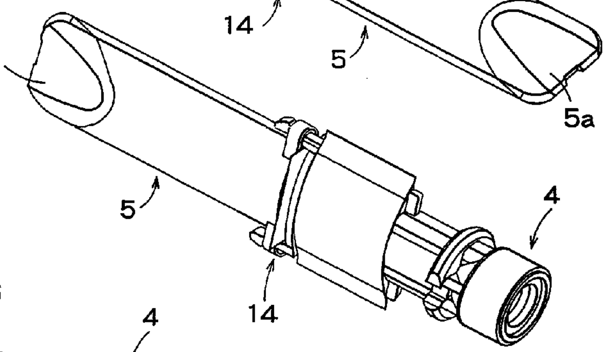
Figure 7C:
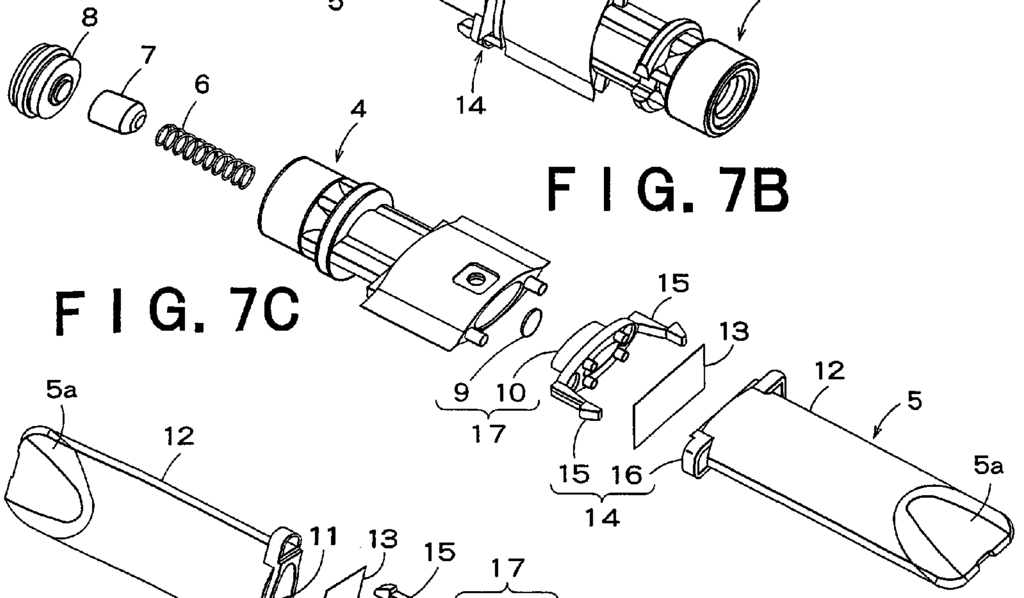
Figure 7D:
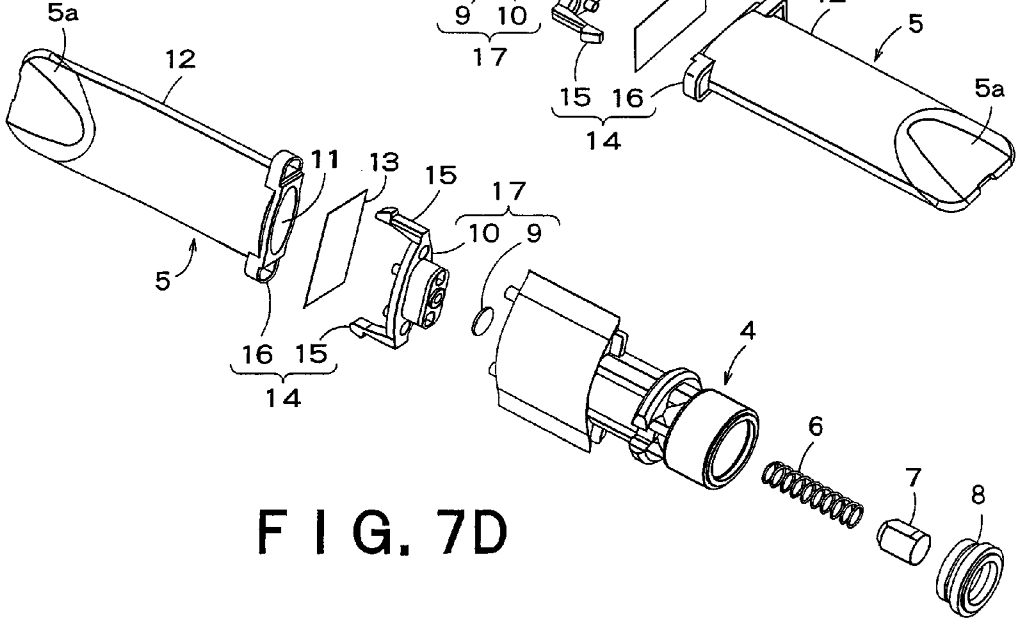

As shown in FIGS. 3 and 4, at the outer end of the ink feed port member 4, a spring seat 7 pressed by a spring 6 is arranged internally and a seal member 8 is attached. Further, at the inner end of the ink feed port member 4, a valve body 9 is arranged internally and a check valve cover member 10 is attached. The check valve cover member 10 is formed separately from the ink feed port member 4 and then is attached to the ink feed port member 4 by thermal caulking.

A check valve means 17 composed of the valve body 9 and the check valve cover member 10 functions to open only when ink flows in the direction flowing out from the flexible ink bag 3.

As shown in FIG. 4, on the front of the case member 50, a pressurized fluid introducing port 52 for introducing a pressurized fluid for pressurizing ink in the case member 50 and sending it out from the ink container 2 into the case member 50 is formed. Furthermore, on the front of the case member 50, a pair of positioning holes 53*a* and 53*b* into which a pair of positioning projections installed in the cartridge mounting unit 101 is inserted is formed.

Further, in one corner of the case member 50 including the front, a malmounting preventive structure 54 is installed. The malmounting preventive structure 54, when mounting the ink cartridge 1 on the ink jet recording apparatus 100, to correctly mount the ink cartridge 1 of a predetermined ink kind in a predetermined position, is given a shape for preventing ink cartridges other than the ink cartridge of the correct ink kind from mounting.

Furthermore, on the front of the case member 50, an ink feed opening 55 where the front end of the ink feed port member 4 is arranged is formed.

As shown in FIGS. 3 to 5B, the gas absorption device 5 has a decompressed container 12 having an opening 11 and a flexible film 13 for sealing the opening 11 when the decompressed container 12 is decompressed internally. The gas absorption device 5 is formed separately from the flexible ink bag 3, is arranged in the flexible ink bag 3, and is fixed to the ink feed port member 4.

The flexible film 13 is adhered airtightly to the periphery of the opening 11 of the decompressed container 12 by thermal welding. By using thermal welding, the opening 11 of the decompressed container 12 can be surely closed by the flexible film 13.

The overall outer surface of the gas absorption device 5 is in contact with ink in the ink container 2. And, the gas absorption device 5 includes a portion having an inner surface which receives the decompressed pressure in the decompressed container 12 and an outer surface which is in contact with ink in the ink container 2, and at lease a part of this portion is formed by a gas permeable material through which gas dissolved in the ink in the ink container 2 can permeate. More concretely, at least a part of the decompressed container 12 and/or at least a part of the flexible film 13 are/is formed by a gas permeable material. Preferably, the whole decompressed container 12 and/or the whole flexible film 13 are/is formed by a gas permeable material to ensure a large contact area between it and ink.

Here, the gas permeable material includes thermoplastic resin and it is preferably any of polypropylene, polyethylene, and polystyrene. These thermoplastic resins are materials hard to chemically react with ink and moreover are materials having proper permeability to gas.

The flexible ink bag 3 of the ink container 2 is formed by a flexible film composed of a material of smaller permeability to gas than that of the gas permeable material constituting at least a part of the gas absorption device 5. Concretely, the flexible ink bag 3 is composed of a single layer film or a laminated film having at least one kind of film of an aluminum laminated film, a silica deposited film, and an alumina deposited film.

As mentioned above, since the flexible ink bag 3 of the ink container 2 is formed by a flexible film composed of a material of smaller permeability to gas than that of the gas permeable material constituting at least a part of the gas absorption device 5, gas permeating through the flexible ink bag 3 of the ink container 2 and dissolved in ink can be surely absorbed by the gas absorption device 5.

As shown in FIGS. 6A to 7D, when the liquid in the ink container 2 is consumed and the flexible ink bag 3 is crushed, to enable the flexible ink bag 3 to be easily adhered to the outer surface of the gas absorption device 5, the ink feed port member 4 and the decompressed container 12 of the gas absorption device 5 have substantially the common structures on the contact parts thereof and the outer surface shape of the decompressed container 12 of the gas absorption device 5 is made round. Furthermore, the end 5*a* of the gas absorption device 5 on the opposite side of the part connected to the liquid feed port member 4 is formed flat.

By doing this, the flexible ink bag 3 crushed due to consumption of ink is sufficiently adhered to the outer surfaces of the ink feed port member 4 and the gas absorption device 5 and the amount of ink remaining in the ink container 2 without being consumed can be reduced.

Further, the opening 11 of the decompressed container 12 is formed in a smaller dimension than that of the part of the ink feed port member 4 opposite to the gas absorption device 5. By doing this, the gas absorption device 5 can be attached to the ink feed member 4 free of obstacles. Further, since there is no level difference between the ink feed port member 4 and the gas absorption device 5, the flexible ink bag 3 crushed due to consumption of ink is sufficiently adhered to the outer surfaces of the ink feed port member 4 and the gas absorption device 5 so that the amount of ink remaining in the ink container 2 without being consumed can be reduced.

Further, the flexible film 13 of the gas absorption device 5 is adhered to the opening 11 formed on the part of the gas absorption device 5 opposite to the ink feed port member 4, so that the flat adhesion surface necessary to adhere the flexible film 13 is positioned between the gas absorption device 5 and the ink feed port member 4 and can be hidden so as to prevent it from coming out on the outer surfaces. By doing this, when the ink in the ink container 2 is consumed and the flexible ink bag 3 is crushed, the adhesion of the flexible ink bag 3 to the outer surface of the gas absorption device 5 is not obstructed by the flat film adhesive face. Therefore, the flexible ink bag 3 crushed due to consumption of ink is sufficiently adhered to the outer surfaces of the ink feed port member 4 and the gas absorption device 5 so that the amount of ink remaining in the ink container 2 without being consumed can be reduced.

The ink container 2 in this embodiment additionally has a fixing means 14 for fixing the gas absorption device 5 to the ink feed port member 4. The fixing means 14 is composed of a pair of claw-shaped projections 15 installed at the end of the ink feed port member 4 in the container and a pair of locking holes 16 installed at the end of the gas absorption device 5 on the ink feed port side for locking the pair of claw-shaped projections 15 inserted.

In this embodiment, the pair of claw-shaped projections 15 are not installed directly on the ink feed port member 14, but is formed integrally with the check valve cover member 10, and then is attached to the ink feed port member 4 via the check valve cover member 10.

And, when attaching the gas absorption device 5 to the ink feed port member 4, the pair of claw-shaped projections 15 are connected to the pair of locking holes 16 by snap fit, thus it can be assembled simply. Therefore, the manufacturing cost can be reduced.

Next, the manufacturing method of the gas absorption device 5 will be explained.

Figure 8A:
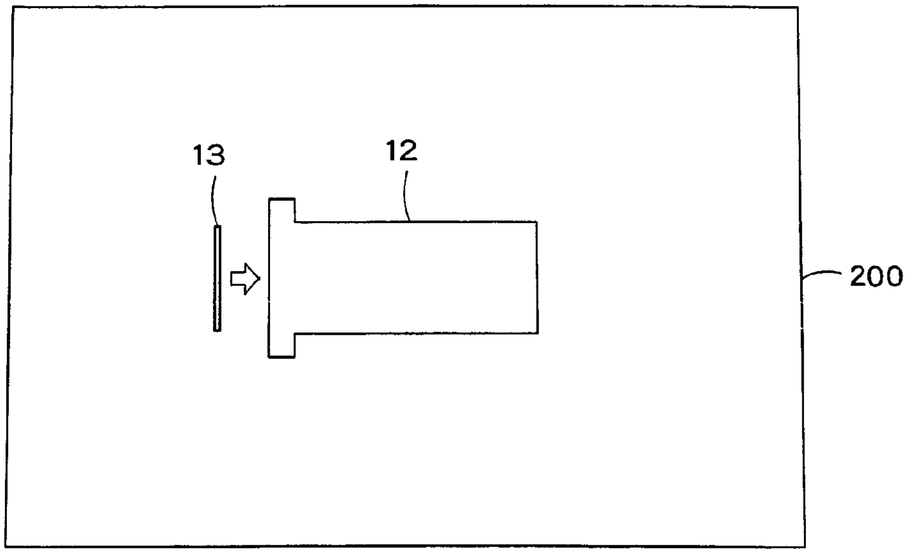
FIGS. 8A and 8B are drawings for explaining a method for manufacturing the gas absorption device of an embodiment of the present invention.

Firstly, the decompressed container 12 having the opening 11 is prepared. Next, the decompressed container 12 is internally decompressed to a pressure lower than the atmospheric pressure and the opening 11 is sealed by the flexible film 13. This sealing step, as shown in FIG. 8A, is executed in a decompressed chamber 200 which is decompressed to a pressure lower than the atmospheric pressure.

Figure 8B:
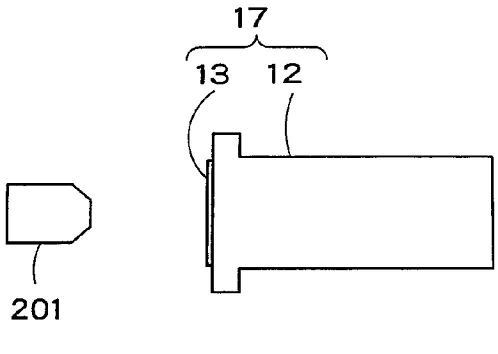
Figure 9A:
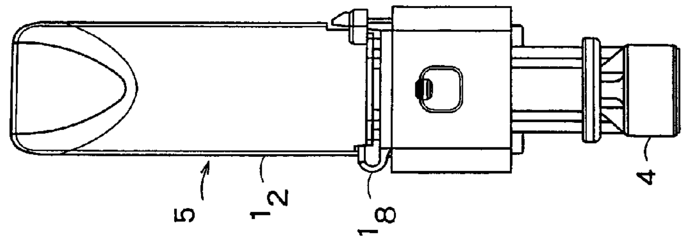
FIGS. 9A to 9F are drawings showing the ink feed port member and the gas absorption device of a modified example of an embodiment of the present invention.
Figure 9B:
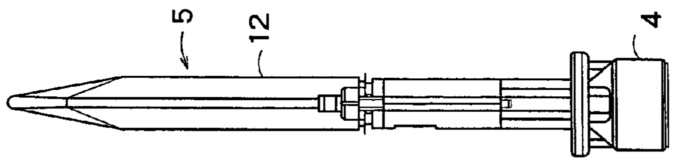
Figure 9C:
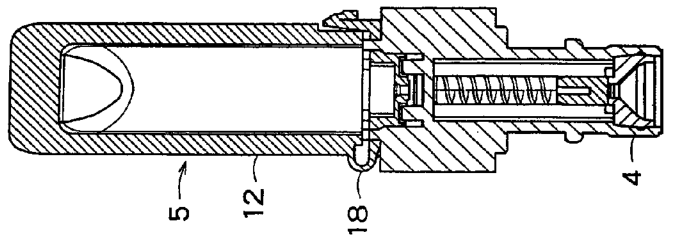
Figure 9D:
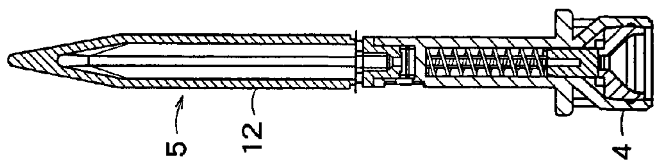
Figure 9E:
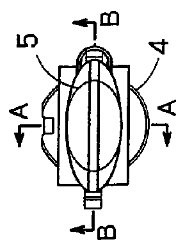
Figure 9F:
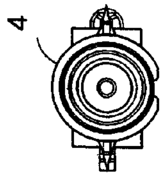
Figure 10A:
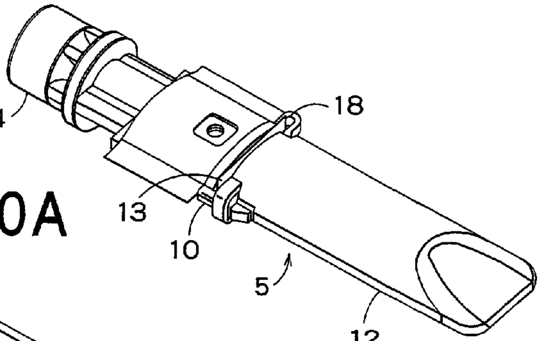
FIGS. 10A to 10D are drawings showing the ink feed port member and the gas absorption device of a modified example of an embodiment of the present invention.
Figure 10B:
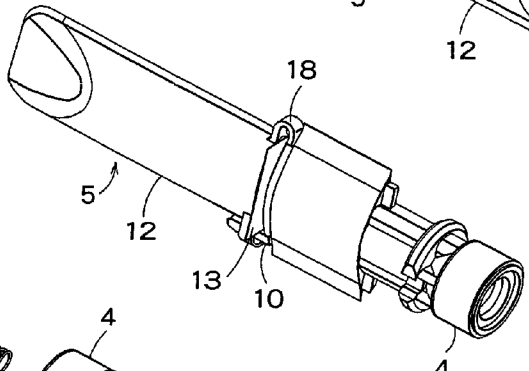
Figure 10C:
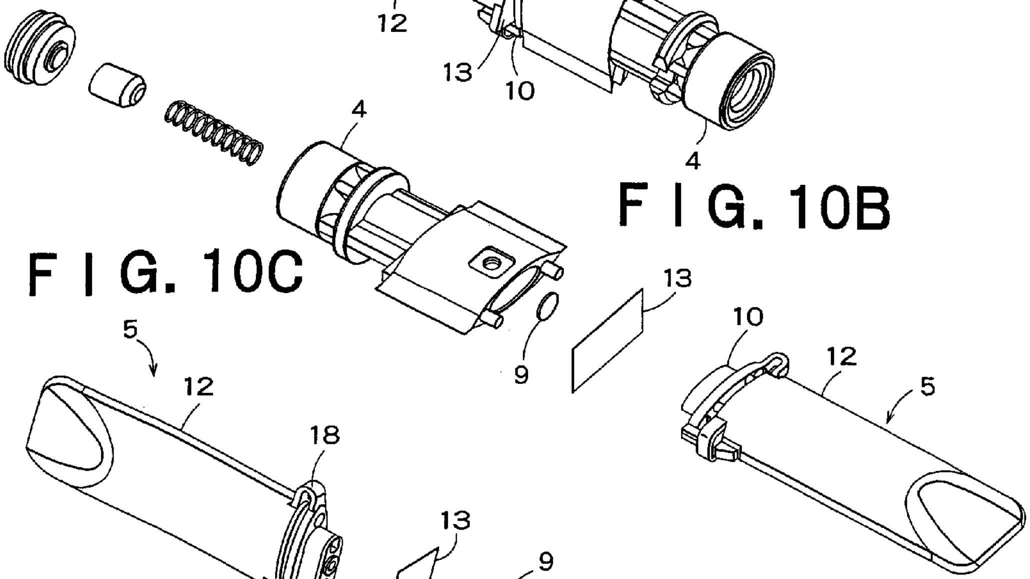
Figure 10D:
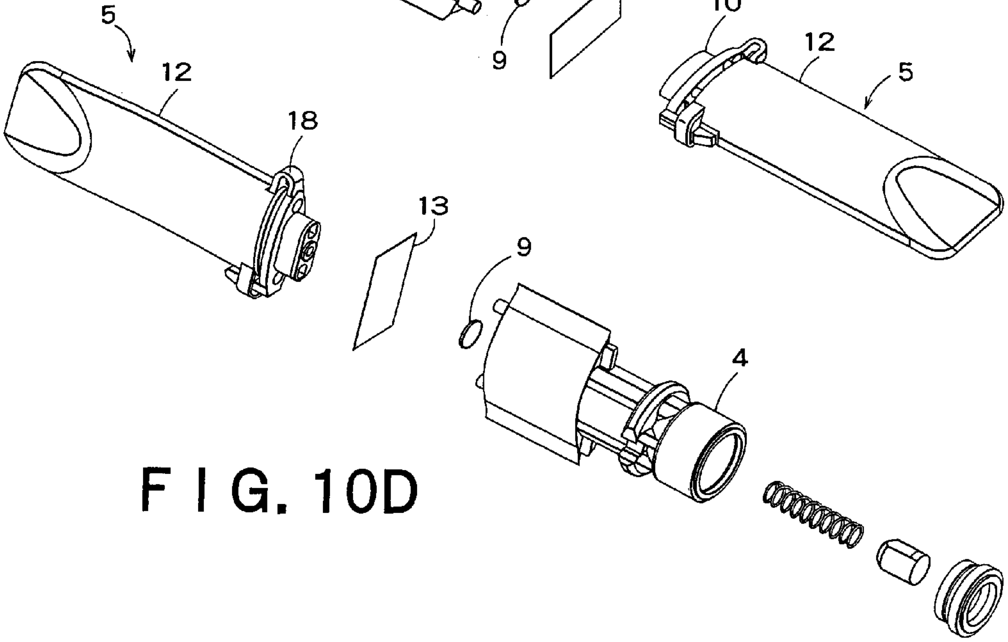
Figure 11A:
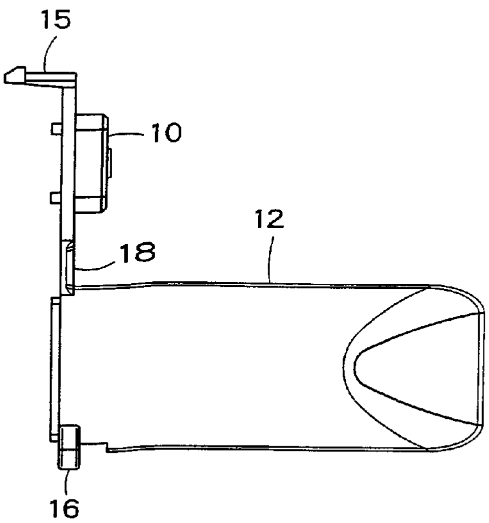
FIGS. 11A to 11D are drawings showing the decompressed container and the check valve cover member of the modified example shown in FIGS. 10A to 10D, and FIGS. 11A and 11C are a plan view and a perspective view showing the state that the check valve cover member is positioned at the open position of the fixing means.
Figure 11B:
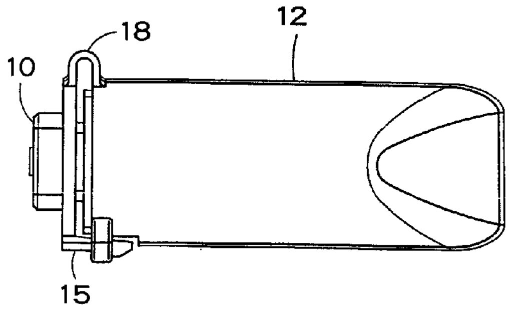
Figure 11C:
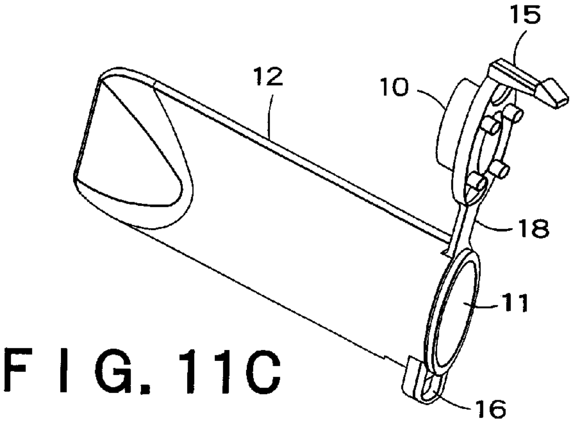
Figure 11D:
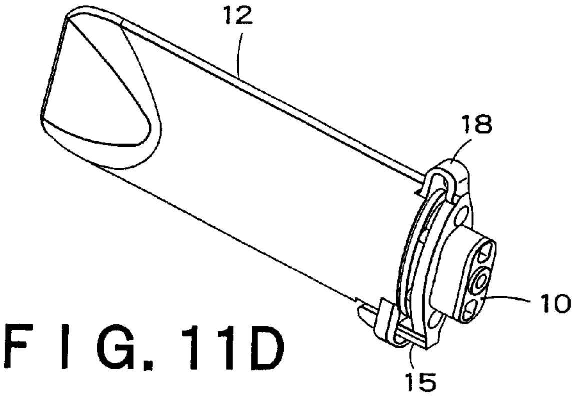

Next, the decompressed container 12 with the flexible film 13 adhered is taken out from the decompressed chamber 200. And, as shown in FIG. 8B, the deflection of the flexible film 13 sealing the opening 11 under the atmospheric pressure is measured by an optical sensor 201 and on the basis of the deflection of the flexible film 13, the decompressed status in the decompressed container 12 is examined.

As mentioned above, at least a part of the decompressed container 12 and/or at least a part of the flexible film 13 are/is formed by a gas permeable material.

As mentioned above, according to this embodiment, since at least a part of the decompressed container 12 of the gas absorption device 5 and/or at least a part of the flexible film 13 are/is formed by a gas permeable material, gas dissolved in ink permeates the part of the gas permeable material of the gas absorption device 5 and is absorbed into the decompressed container 12 in the decompressed state. By doing this, generation of gas in ink in the ink container 2 due to pressure changes during printing is suppressed and deterioration in the printing quality due to generation of gas can be prevented.

Furthermore, in this embodiment, since the gas absorption device 5 can be made by sealing the opening 11 of the decompressed container 12 in the decompressed state by the flexible film 13, the gas absorption device 5 internally decompressed can be manufactured simply, and the decompressed status of the decompressed container 12 during manufacture can be examined simply by examining the deflection of the flexible film 13 by the optical sensor 201.

Further, in this embodiment, since the gas absorption device 5 is fixed to the ink feed port member 4 by the fixing means 14, even if the ink container 2 is given a shock such as vibration or falling, the inner surface of the flexible ink bag 3 will not be damaged due to movement of the gas absorption device 5 in the ink container 2.

Moreover, since the mounting position of the gas absorption device 5 is on the ink feed port side, it will not be resulted that the residual amount of ink is increased because the flexible ink bag 3 is hardly crushed due to consumption of ink. Further, since the gas absorption device 5 is arranged on the ink feed port side of the ink container 2, when the flexible ink bag 3 is crushed, a flow path for the ink remaining on the opposite side of the ink feed port to flow toward the feed port side is reserved, thus the residual amount of ink can be reduced.

Furthermore, in this embodiment, since the gas absorption device 5 is fixed to the ink feed port member 4 by the fixing means 14, even if the ink container 2 is given a shock such as vibration or falling, the inner surface of the flexible ink bag 3 will not be damaged due to movement of the gas absorption device 5 in the ink container 2.

Moreover, since the mounting position of the gas absorption device 5 is on the ink feed port side, it will not be resulted that the residual amount of ink is increased because the flexible ink bag 3 is hardly crushed when ink is consumed. Further, since the gas absorption device 5 is arranged on the ink feed port side of the ink container 2, when the flexible ink bag 3 is crushed, a flow path for the ink remaining on the opposite side of the ink feed port to flow toward the feed port side is reserved, thus the residual amount of ink can be reduced.

Next, as a modified example of the aforementioned embodiment, as shown in FIGS. 9A to 11D, the check valve cover member 10 can be formed integrally with the decompressed container 12 of the gas absorption device 5. Concretely, the check valve cover member 10 is structured so as to be connected to the decompressed container 12 via a flexible piece 18 and be capable of displacing between the fixing position (FIGS. 11B and 11D) and the open position (FIGS. 11A and 11C) of the fixing means 14.

Also in this modified example, the similar effect to that of the aforementioned embodiment can be obtained and since the number of parts is reduced, the manufacturing cost can be decreased.

Although the invention has been described in its preferred embodiment with a certain degree of particularity, obviously many changes and variations are possible therein. It is therefore to be understood that the present invention may be practiced otherwise than as specifically described herein without departing from the scope and spirit thereof.

What is claimed is:

1. A gas absorption device configured to be arranged within a liquid container for storing a liquid to be fed to a liquid consumption apparatus, comprising:

a decompressed container having an opening, said decompressed container being formed separately from said liquid container so as to be arranged within said liquid container; and a flexible film sealing said opening in a state that said decompressed container is internally decompressed, wherein:

said gas absorption device includes a portion having an inner surface which receives a decompressed pressure in said decompressed container and an outer surface which is in contact with said liquid in said liquid container, at least a part of said portion of said gas absorption device being formed by a gas permeable material through which a gas dissolved in said liquid in said liquid container can permeate.

2. A gas absorption device according to claim 1, wherein at least a part of said decompressed container is formed by said gas permeable material.

3. A gas absorption device according to claim 1 or 2, wherein at least a part of said flexible film is formed by said gas permeable material.

4. A gas absorption device according to any claim 1 or 2, wherein said gas permeable material includes thermoplastic resin.

5. A gas absorption device according to claim 4, wherein said thermoplastic resin is any of polypropylene, polyethylene, and polystyrene.

6. A gas absorption device according to claim 1 or 2, wherein said flexible film is adhered airtightly to a periphery of said opening of said decompressed container by thermal welding.

7. A liquid container for storing a liquid to be fed to a liquid consumption apparatus, comprising:

a container body for internally storing said liquid; and a gas absorption device as defined in claim 1 or 2 and arranged in said container body.

8. A method of manufacturing a gas absorption device configured to be arranged within a liquid container for storing a liquid to be fed to a liquid consumption apparatus, comprising:

providing a decompressed container having an opening, said decompressed container being formed separately from said liquid container so as to be arranged within said liquid container; and sealing said opening by a flexible film in a state that said decompressed container is internally decompressed to a pressure lower than an atmospheric pressure, wherein:

said gas absorption device includes a portion having an inner surface which receives a decompressed pressure in said decompressed container and an outer surface which is in contact with said liquid in said liquid container, at least a part of said portion of said gas absorption device being formed by a gas permeable material through which a gas dissolved in said liquid in said liquid container can permeate.

* * * * *